(12) United States Patent
Yuan

(10) Patent No.: US 7,232,175 B2
(45) Date of Patent: Jun. 19, 2007

(54) WIND, ROCK AND BUG DEFLECTOR

(76) Inventor: J. C. Yuan, 1820 Bolanos St., Rowland Heights, CA (US) 91748

( * ) Notice: Subject to any disclaimer, the term of this patent is extended or adjusted under 35 U.S.C. 154(b) by 221 days.

(21) Appl. No.: 11/034,121

(22) Filed: Jan. 12, 2005

(65) Prior Publication Data
US 2006/0152031 A1     Jul. 13, 2006

(51) Int. Cl.
*B60J 1/20* (2006.01)
(52) U.S. Cl. ................................. 296/91; 296/180.1
(58) Field of Classification Search ............... 296/91, 296/180.1
See application file for complete search history.

(56) References Cited
U.S. PATENT DOCUMENTS 3,214,215 A * 10/1965 Hansen .................... 296/91
3,328,074 A * 6/1967 Van Rossem ............ 296/180.1
3,647,256 A * 3/1972 Cox .......................... 296/91
4,357,045 A * 11/1982 Kinford, Jr. ............ 296/180.2
5,707,097 A * 1/1998 Horwill .................... 296/91

\* cited by examiner

*Primary Examiner*—Joseph D. Pape

(57) ABSTRACT

A debris deflector to deflect oncoming wind rocks and bugs by diverting the wind which is associated with rocks, bugs, and other debris instead of heading for the hood and windshield of a vehicle, and diverts these nuisances up and away from the vehicle's body. The deflector attaches to the front of a car, truck, sport utility vehicle (SUV), or any other type of vehicle that is prone to oncoming debris. The deflector includes a wing and a pair of pillars connecting the wing to a wind tunnel portion. Air directed through the air passageway formed between the wing and the wind tunnel portion is accelerated and is directed upwardly to deflect debris.

1 Claim, 5 Drawing Sheets

WIND, ROCK AND BUG DEFLECTOR

BACKGROUND OF THE INVENTION

1. Field of the Invention

The present invention relates to the field of automobiles and specifically to a wind, rock and bug deflector.

2. Brief Description of the Related Art

Vehicles such as automobiles travel in this day and age at increased speeds. As a vehicle travels faster, the more susceptible the vehicle is to debris such as rocks, flying insects or other bugs that stick to the front of a vehicle. Usually, these type of debris land on the hood or on the windshield. A vehicle's front hood and windshield are prone to nicks, scratches and denting from rocks, pebbles or other debris is kicked up from other vehicles and onto a vehicle's hood and windshield thereby causing damage. Flying insects or other bugs that stick to the front hood of a vehicle or windshield are a nuisance and are a safety hazard as a driver's view is obstructed.

The present invention relates to a wind, rock and bug deflector that solves the above mentioned problems. The present invention serves to deflect oncoming wind, rocks and bugs and water by diverting the wind which is associated with rocks, bugs, water and other debris instead of heading for the hood and windshield of a vehicle, and diverts these nuisances up and away from the vehicle's body.

SUMMARY OF THE INVENTION

The present invention is a wind, rock and bug deflector that helps to prevent debris, such as rocks, flying insects or other bugs from landing on a vehicle by deflecting oncoming wind, rocks bugs and water by diverting the wind which is associated with rocks, bugs and other debris instead of heading for the hood and windshield of a vehicle, and diverts these nuisances up and away from the vehicle's body.

The present invention attaches to the front of a car, truck, sport-utility vehicle (SUV), or any other type of vehicle that is prone to oncoming debris. The present invention is attached and can be affixed to the front of a hood of a vehicle.

The present invention has a lower portion (wind tunnel) and an upper portion (wing). The two portions are connected with pillars. Said pillars are of such size as to allow flow of wind between and around pillars.

The front opening between wind tunnel and wing is proportionally larger and gradually decreases in width toward the terminus when the wind reaches the rear portion of the wind tunnel. The decrease in size at the terminal portion between the wind tunnel and wing, causes the wind that has entered through the front to increase in velocity as the wind exits the chamber. This gradual decrease in size thereby acts as a venturi in causing a more powerful stream of air as it exits. This powerful stream of air thereby deflects oncoming rocks, bugs and other debris from hitting the front hood and windshield of a vehicle. The stream of air deflects the oncoming debris up and away from a vehicle's front hood and windshield.

Another example of a possible use of the deflector of the present invention and not a limitation, in addition to functioning to deflect rocks, and bugs, is to provide for an aerodynamic means for high speed driving. As the wind enters into the wind slot and is forced out through the venturi, the upward force of the wind thereby causes a downward force on the front of the vehicle for increased traction at the front wheels at high speed driving.

The present invention including said wind tunnel connects to a base portion. Said base portion has attachment means for placement on front of a vehicle. Said attachment means may include rubber guides varying in number to allow for close fit onto hood of vehicle without damaging painted surfaces.

The present invention is manufactured with light and durable material, by way of example and not limitation, such as fiberglass or plastic, and can be painted a matching color with the vehicle exterior.

In accordance with a preferred embodiment of the invention, there is disclosed a wind, rock and bug deflector comprising: a base portion, wind tunnel, pillars, wing, venturi portion, and an attachment means.

Still other objects, features, and attendant advantages of the present invention will become apparent to those skilled in the art from a reading of the following detailed description of embodiments constructed in accordance therewith, taken in conjunction with the accompanying drawings.

DESCRIPTION OF PREFERRED EMBODIMENTS

Figure 1:
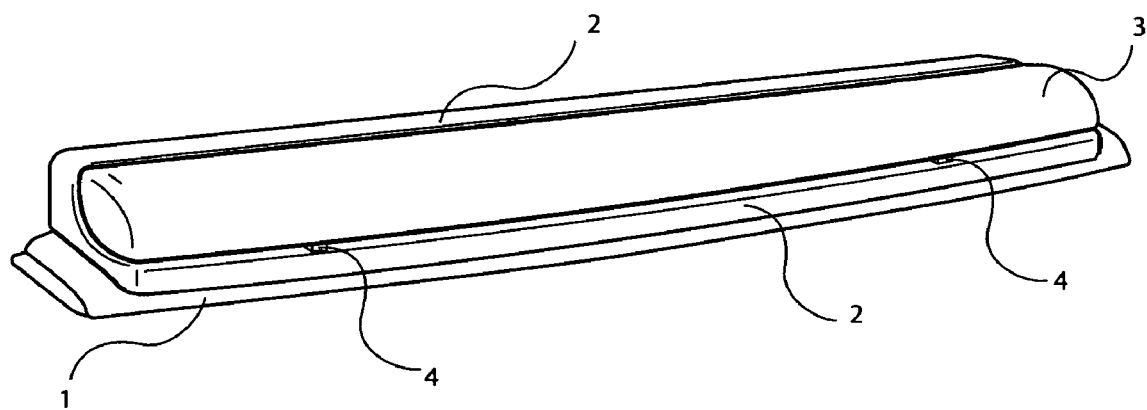
FIG. 1 shows a perspective view of a top, front and right side of the wind, rock and bug deflector of the present invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. Referring to the drawing figures, like reference numerals designate identical or corresponding elements throughout the several figures.

In accordance with a preferred embodiment of the invention, there is disclosed a wind, rock and bug deflector comprising: a base portion, wind tunnel, pillars, wing, venturi portion, and an attachment means.

The prospective view of FIG. 1 shows a base portion (1) connected to the wind tunnel (2), and a wing (3) connected to wind tunnel with pillars (4).

Figure 2:
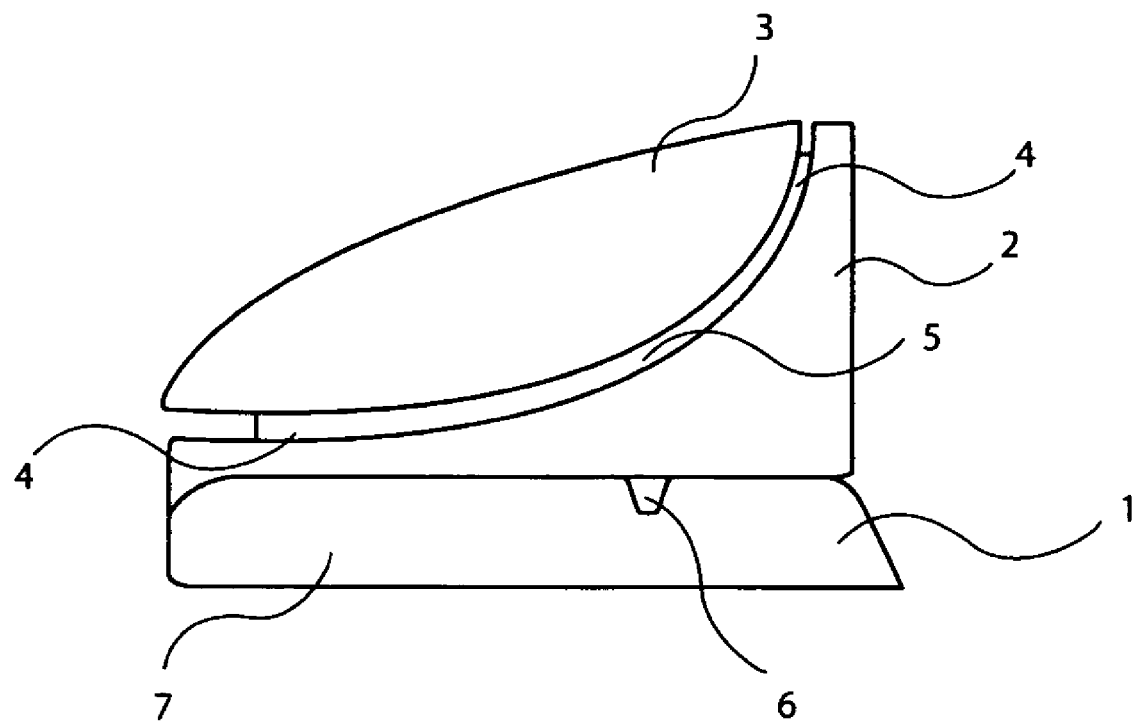
FIG. 2 shows a left side view of the wind, rock and bug deflector of the present invention.

FIG. 2 shows a left side view of the wind, rock and bug deflector of the present invention detailing a side perspective of the base (1); wind tunnel (2); wing (3); pillar (4); venturi (5), detailing a gradual decrease in size from entrance for wind to exit; and a see through view of rubber guide (6), as can be seen through a cut away of attachment means (7).

Figure 3:
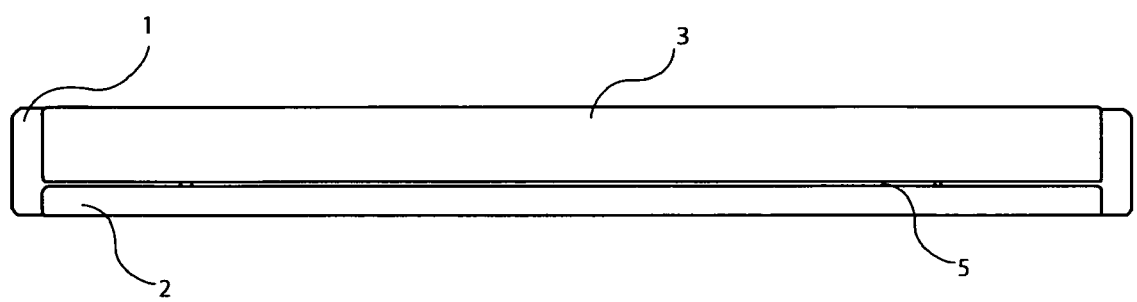
FIG. 3 shows a top view of the wind, rock and bug deflector of the present invention.

FIG. 3 shows a top view of the wind, rock and bug deflector of the present invention detailing the base (1); the wind tunnel (2); the wing (3); and exit of venturi (5).

Figure 4:
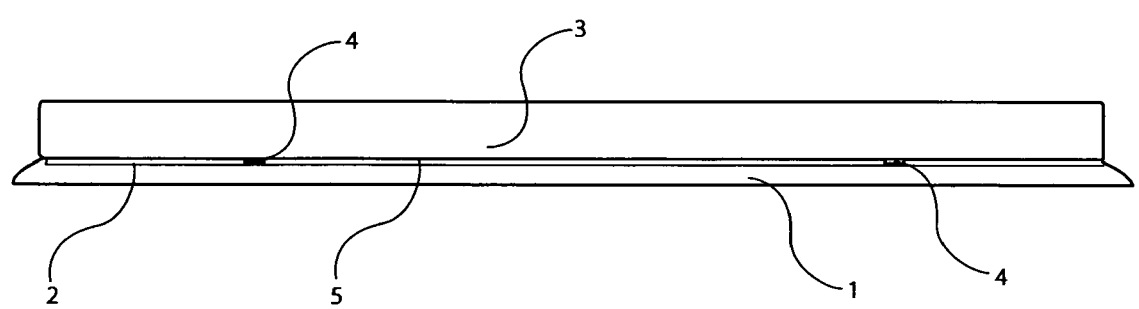
FIG. 4 is a front view of the wind, rock and bug deflector of the present invention.

FIG. 4 is a front view of the wind, rock and bug deflector of the present invention detailing the base portion (1); wind tunnel portion (2) with an opening for entrance of air to the venturi (5); and wing (3) as connected by pillars (4).

Figure 5:
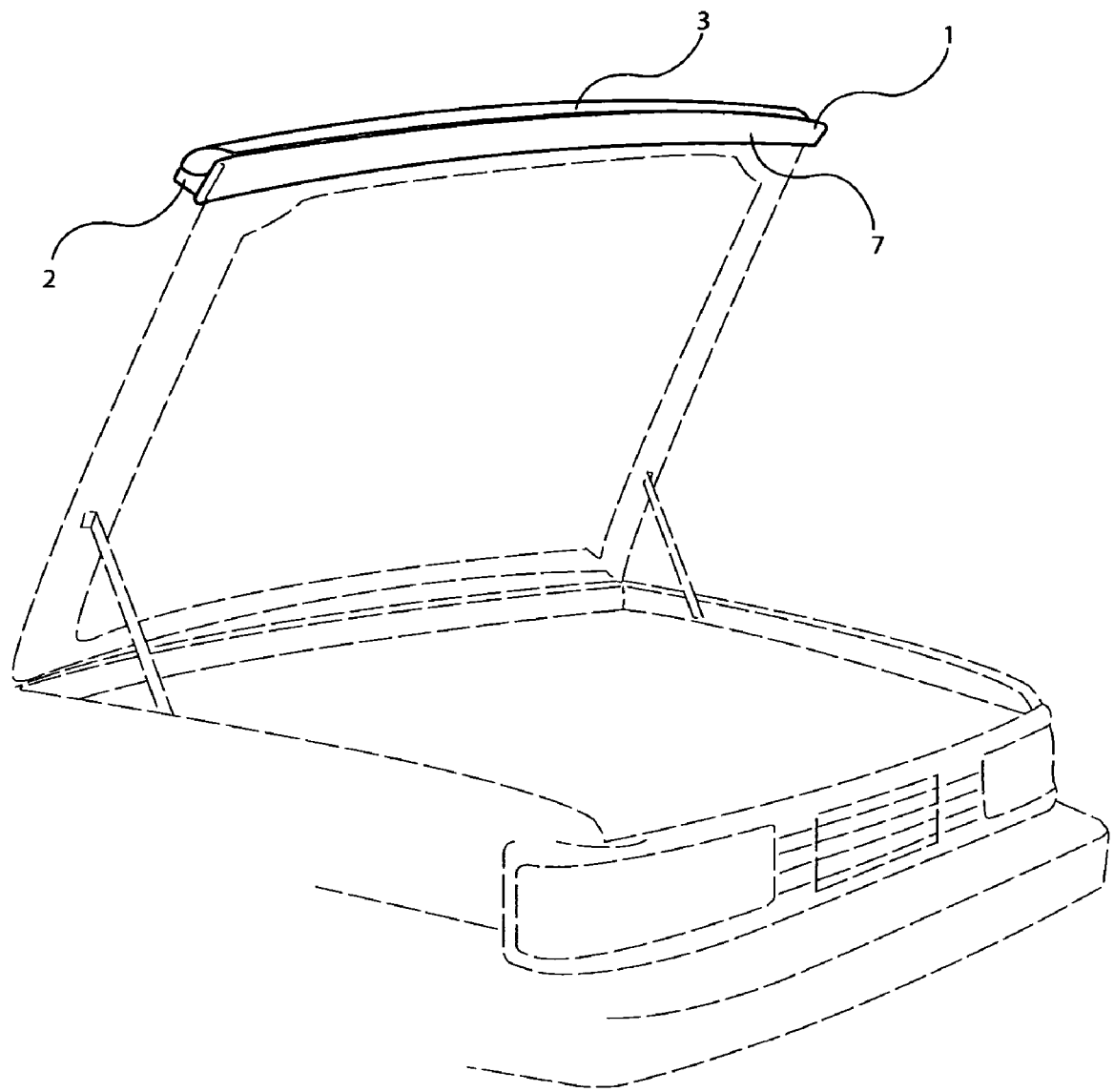
FIG. 5 shows a view of the wind, rock and bug deflector of the present invention as attached onto a hood of a vehicle.

FIG. 5 shows a view of the wind, rock and bug deflector of the present invention as attached onto a hood of a vehicle detailing the base (1); wind tunnel (2); wing (3); and attachment means (7) for securing onto vehicle.

In comparison to the existing technologies, the uniqueness of this invention is set forth as the following: The present invention is wind, rock and bug deflector and can be made from a variety of rigid and sturdy materials, including fiberglass and plastics.

The wind, rock and bug deflector of the present invention is extremely easy to attach onto a vehicle without the need for tools or special skills. The present invention can be securely attached whereby the base portion can be attached to a vehicle's front hood.

The present invention may provide a means in which particles such as rocks, bugs or other debris are deflected and diverted up and away from a vehicle's front hood and front windshield.

Another example of a possible use of the deflector of the present invention and not a limitation, in addition to functioning to deflect rocks, and bugs, is to provide for an aerodynamic means for high speed driving. As the wind enters into the wind slot and is forced out through the venturi, the upward force of the wind thereby causes a downward force on the front of the vehicle for increased traction at the front wheels at high speed driving.

Still other objects, features, and attendant advantages of the present invention will become apparent to those skilled in the art from a reading of the detailed description of embodiments constructed in accordance therewith, taken in conjunction with the accompanying drawings.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention described by the foregoing includes all changes that come within the meaning, range and equivalence thereof and is intended to be embraced therein.

What is claimed is:

1. A debris deflector for a windshield of a vehicle comprising:

a base portion;

attachment means for mounting the base portion to a front edge of a front hood of the vehicle, a wing having a convex upper surface and a convex lower surface;

a pair of pillars;

a wind tunnel portion having an upper concave surface which is spaced from the lower convex surface of the wing by the pair of pillars, the wind tunnel portion further having a lower surface mounted to the base portion;

wherein an air passageway is formed between the lower concave surface of the wing and the upper convex surface of the tunnel portion with the width of the air passageway narrowing from a front opening to a rear opening thereof resulting in an increase in air flow velocity exiting the passageway in an upward direction to deflect debris that would otherwise have impacted the windshield.

* * * * *